US007680123B2

(12) United States Patent
Veerepalli

(10) Patent No.: US 7,680,123 B2
(45) Date of Patent: Mar. 16, 2010

(54) MOBILE TERMINATED PACKET DATA CALL SETUP WITHOUT DORMANCY

(75) Inventor: Sivaramakrishna Veerepalli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 648 days.

(21) Appl. No.: 11/349,617

(22) Filed: Feb. 7, 2006

(65) Prior Publication Data
US 2007/0165561 A1 Jul. 19, 2007

Related U.S. Application Data

(60) Provisional application No. 60/759,679, filed on Jan. 17, 2006.

(51) Int. Cl.
*H04L 12/28* (2006.01)
(52) U.S. Cl. .................... 370/395.3; 709/245
(58) Field of Classification Search ................ 370/328, 370/351–356
See application file for complete search history.

(56) References Cited

U.S. PATENT DOCUMENTS

| 6,707,809 | B1 * | 3/2004 | Warrier et al. ............... 370/351 |
| 2001/0036224 | A1 * | 11/2001 | Demello et al. ............. 375/220 |
| 2005/0028011 | A1 * | 2/2005 | Motoyoshi et al. .......... 713/201 |
| 2005/0144321 | A1 * | 6/2005 | Forsberg .................... 709/245 |
| 2006/0227971 | A1 * | 10/2006 | Haddad ...................... 380/247 |

FOREIGN PATENT DOCUMENTS

| WO | 03/019973 A2 | 3/2003 |
| WO | 2005/043860 A1 | 5/2005 |

OTHER PUBLICATIONS

International Preliminary Report on Patentability-PCT/US07/060594, The International Bureau of WIPO, Geneva Switzerland-07-22-08.
International Search Report-PCT/US07/060594, International Search Authority-European Patent Office-05-09-07.
Written Opinion-PCT/US07/060594, International Search Authority-European Patent Office-05-09-07.

* cited by examiner

*Primary Examiner*—Rafael Pérez-Gutiérrez
*Assistant Examiner*—Marcos Batista
(74) *Attorney, Agent, or Firm*—Alex C. Chen; Kristine U. Ekwueme

(57) ABSTRACT

When the binding of a mobile station (MS) in a home agent (HA) expires, the HA generates an identifier from the MS's IMSI. The HA maintains a binding between the home address (HoA) and a special care of address (MAP-CoA), where the host ID of MAP-CoA is the identifier, and where the network ID of MAP-CoA is a special code. When a packet destined for the HoA is received at the HA, the HA responds by communicating the MAP-CoA to the PDSN that serves the special code. The PDSN recovers the IMSI from the host ID of the MAP-CoA, and uses the IMSI to page the MS. The MS responds by setting up a call, obtaining a new care of address, and then binding the new care of address with its HoA in the HA. Advantageously, packets can be sent to a dormant MS at its HoA without out-of-band signaling.

30 Claims, 7 Drawing Sheets

PUSH PDSN CONTACTS MOBILE UNIT

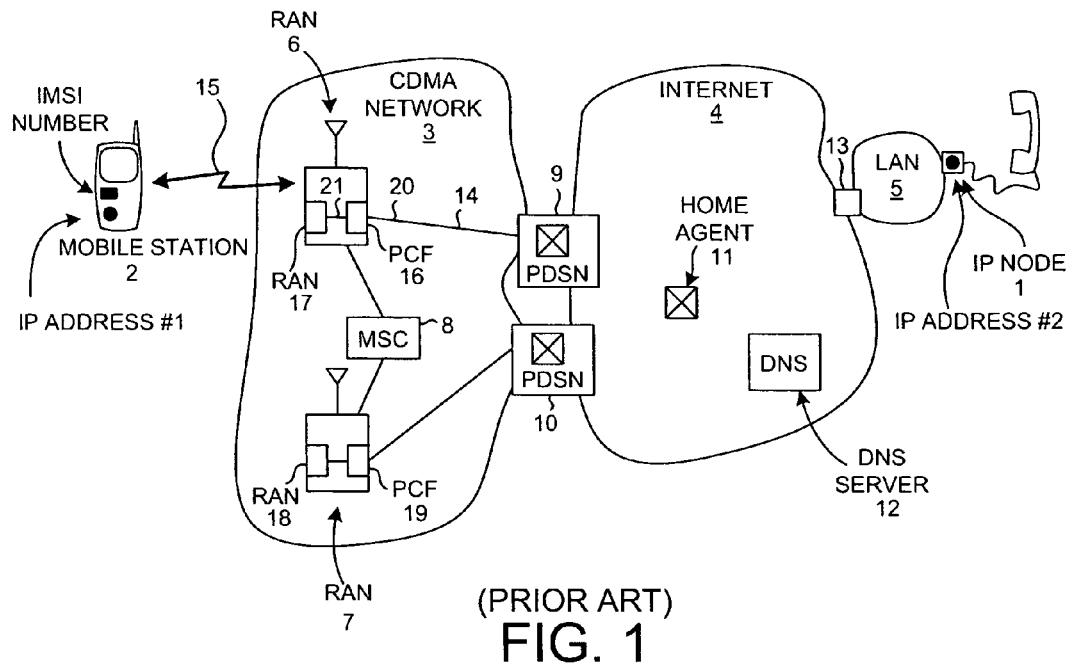
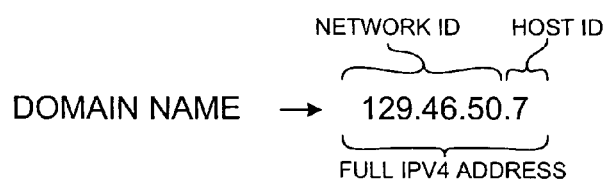
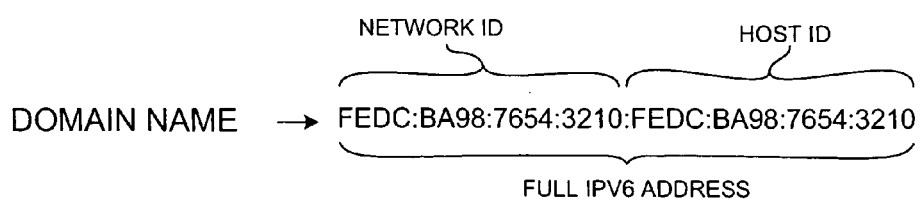
(PRIOR ART)
FIG. 1
(PRIOR ART)
FIG. 2

BINDING

COMM THRU FIRST PDSN

HOME AGENT TIMER EXPIRES AND
MAP-CoA IS BOUND TO HOA

PUSH PDSN CONTACTS MOBILE UNIT

MOBILE UNIT BINDS NEW COA

COMM THRU SECOND PSDN

MOBILE TERMINATED PACKET DATA CALL SETUP WITHOUT DORMANCY

CLAIM OF PRIORITY

This application claims priority to U.S. Provisional Patent Application No. 60/759,679, filed Jan. 17, 2006.

FIELD

The disclosed embodiments relate generally to mobile IP networks.

BACKGROUND OF DORMANCY IN IP NETWORKS

FIG. 1 (Prior Art) is a diagram that illustrates an example of dormancy in an IP (Internet Protocol) network. In the example, an IP packet connection is to be made across multiple IP networks from an IP node 1 to a cellular telephone 2. IP node 1 may, for example, be an IP telephone. The cellular telephone 2 is referred to as the "mobile station." IP network 3 is a CDMA (Code-Division Multiplex Access) network. IP network 4 is the Internet. IP network 5 is a local area network (LAN). Any node in any of the IP networks can communicate with any other node in accordance with the IP protocol as long as each of the nodes has an IP address. In the example, nodes include the mobile station 2, a first RAN (Radio Access Network) 6, a second RAN 7, an MSC (Mobile Switching Center) 8, a first PDSN (Packet Data Serving Node) router 9, a second PDSN router 10, a home agent (HA) 11, a DNS server (Domain Name System) 12, a router 13, and IP node 1. PDSN routers 9 and 10 are disposed on the boundary between the CDMA network 3 and the Internet 4. Router 13 is disposed on the boundary between LAN 5 and the internet 4.

In the present example, the protocol PPP (Point-to-Point Protocol) is used to maintain a point-to-point session between PDSN 9 and mobile station 2. The point-to-point session involves a wired link 14 between PDSN 9 and RAN 6 and a wireless link 15 between RAN 6 and mobile station 2. Wireless link 15 is also called the "traffic channel." Initially, the mobile station (MS) uses the PPP point-to-point session to request an IP address from PDSN 9. This IP address will be the IP address of the mobile station. As long as this IP address is a globally unique public IP address, MS 2 could be reached by any other IP node on the Internet. For example, if MS 2 had a domain name, then the IP address for MS 2 could be resolved using its domain name through a DNS server. When MS 2 gets its numerical IP address from PDSN 9, it registers the numerical IP address with DNS server 12 if the DNS server does not already have such a mapping. As a result of the registering, DNS server 12 maintains a mapping between the alphabetic domain name and the numerical IP address.

Next, assume that IP node 1 wants to communicate with mobile station 2. IP node 1 knows the mobile station's alphabetical domain name address M1@Sprint.com, but needs the corresponding numerical IP address in order to be able to send IP packets to MS 2. A DNS client on IP node 1 therefore performs what is called a DNS query to DNS server 12. This query involves presenting the alphabetical domain name to DNS server 12 and asking the DNS server to return the corresponding numerical IP address. The lookup performed by DNS server 12 is called "resolving" the alphabetical domain name address to a numerical IP address. When IP node 1 gets the numerical IP address, it starts communicating IP packets to MS 2 using the numerical IP address. For IP packets sent from IP node 1 to MS 2, the numerical IP address is the destination IP address in the IP headers of the IP packets.

In a mobile network, it is generally not desired to maintain the wireless link (called the traffic channel) in an active state when the mobile station is not communicating. Keeping the traffic channel active when it is not being used involves unnecessary cost. It is, however, generally desired that the mobile station not have to release its assigned IP address just because the traffic channel is down. Consider the situation in which MS 2 is being used to do web browsing. The user of MS 2 downloads a web page into MS 2, and then spends time reading that web page for a while. Then, after a delay, the user selects a link on the downloaded page and then proceeds to download the associated web page for further browsing. If, during the reading of the web page, the IP address that was assigned to MS 2 is released, then when the user selects the link in order to download another web page, the MS 2 will have to repeat the entire procedure of setting up PPP and getting a new IP address from PDSN 9. To get a new IP address, MS 2 will have to establish a new PPP session to PDSN 9 over which a new IP address can be communicated back to MS 2. Setting up such a PPP session can take two or more seconds. Accordingly, when MS 2 is dormant for a period of time, the traffic channel is released but the PPP session and hence the IP address are not released. The assignment of the IP address to MS 2 is maintained so that when communication resumes and the traffic channel is reactivated, the process of establishing the PPP session and obtaining a new IP address does not need to be undertaken.

When the traffic channel goes down in this scenario during the reading of the web page, PDSN 9 stores the state of the PDSN's PPP state machine. PDSN 9 maintains this state information in association with the IP address assigned to MS 2. MS 2 stores the state of the mobile station's PPP state machine. Because both PDSN 9 and MS 2 have stored the states of their respective PPP state machines, when the traffic channel is reestablished, the PDSN will know what the state of its PPP state machine should be, and the mobile station will know what the state of its PPP state machine should be. Accordingly, when the traffic channel 15 is reestablished after a period of dormancy, use of the PPP session can continue as if there were no interruption to the PPP session. Because the same IP address is still assigned to MS 2, MS 2 can communicate IP packets as before without having to obtain a new IP address. This ability to retain the IP address across multiple traffic channel instantiations is often called "dormancy."

Dormancy has multiple advantages. First, connection time is reduced because a new PPP session does not have to be established every time the traffic channel is reestablished. Second, dormancy allows the mobile station to keep its IP address for a long time. If IP node 1 wants to communicate with MS 2, and IP node 1 knows the IP address of MS 2, then IP node 1 can send IP packets to MS 2 if the traffic channel is down. The IP packets are communicated to PDSN 9, and PDSN 9 forwards them to an intermediary functionality called a PCF (Packet Control Function) 16. In this example, PCF 16 is part of RAN 6. RAN 6 includes RAN functionality (radio transceiver and base station functionality) 17 and PCF functionality 16. RAN 7 includes RAN functionality 18 and PCF functionality 19.

There is a tunnel 20 between PDSN 9 and PCF 16, and another tunnel 21 between PCF 16 and RAN functionality 17. PDSN 9 is shielded from information about dormancy of MS 2, but the PCF 16 is aware of whether MS 2 is dormant or not. Because MS 2 is dormant in this example, PCF 16 sends a message to RAN functionality 17. This message is an instruction to the RAN functionality 17 to page MS 2. As a result of the page, MS 2 responds, the traffic channel is set up, and MS 2 starts receiving the IP packets across the traffic channel.

Now assume that the mobile station's power is cycled or for some other reason the PPP state in mobile station 2 is lost, and the IP address of mobile station 2 is released. PDSN 9 would not be aware of this situation. To handle cases like this, PDSN 9 usually has an inactivity timer called the PDSN PPP INACTIVITY TIMER. MS 2 refreshes the PPP INACTIVITY TIMER through periodic use of the PPP session to keep the timer from expiring. If the timer expires, then PDSN 9 clears the PPP state for the mobile station and assumes that MS 2 is no longer active and probably does not have the IP address anymore. Once the PPP state is cleared, then IP node 1 cannot reach MS 2 any longer because the IP address IP node 1 has for MS 2 is no longer assigned to MS 2. If PDSN 9 receives IP packets destined for the mobile stations's IP address, then PDSN 9 will not forward the IP packets because PDSN 9 no longer has state information for a PPP session to MS 2.

A PDSN also typically only has enough memory resources to maintain a fixed number PPP dormancy states. If this number of PPP states is exceeded, then the PDSN might in FIFO fashion clear out the oldest PPP states even if their inactivity timers have not expired. If the PPP state for the PPP session to MS 2 gets cleared out for this reason, then IP node 1 cannot reach MS 2.

One attempt to address this limitation of dormancy involves using an out-of-band message using the SMS (Short Message Service) service. Although it might be possible to reach MS 2 if MS 2 is in active state or dormant state and the PDSN 9 has the PPP state information stored for this MS 2, IP node 1 has no guarantee about the dormancy state of MS 2. IP node 1 therefore first tries to send something to MS 2. If MS 2 responds, then MS 2 may be dormant or active, and IP node 1 can communicate with MS 2 in normal fashion. If, on the other hand, MS 2 does not respond, then IP node 1 sends an SMS message to MS 2. The SMS message type is a request that MS 2 set up an IP packet call, get an IP address from PDSN 9, and then make the IP address available to IP node 1 so that IP node 1 can start sending packets to that IP address. A problem with this technique is that it relies on an "out-of-band" mechanism. "Out-of-band" means that it is not part of the IP session. SMS is a non-IP service. Use of an out-of-band service is undesirable because there typically has to be special software in mobile station 2 to receive communications from one protocol and then send communication using another protocol, and visa versa. In addition, use of SMS may involve a significant amount of delay, because SMS message delivery is not instantaneous.

BACKGROUND OF MOBILE IPv6

When MS 2 is assigned a numerical IP address by PDSN 9 as described above, the IP address is geographically tied to the PDSN. FIG. 2 (Prior Art) illustrates a numerical IPv4 and IPv6 address. The numerical IP address has two portions. The first portion is a network ID portion that identifies a network. The second portion is a host ID portion that identifies a device on the network. When IP packets get routed, they get routed based on the network ID portion of the IP address. The IP packets are received onto a router, and the router examines the network ID of the destination address in the IP header. The router consults a routing table to determine how to forward the IP packet on to another router so that the IP packet gets closer to the destination network. In the present example, each PDSN is actually associated with a separate network. Both PDSNs and both RANs, may however, be owned by the same cell telephone carrier (for example, Sprint). The networks of both PDSNs 9 and 10 are therefore collectively referred to as IP network 3.

Consider a situation in which MS 2 moves so that it no longer is in wireless communication with RAN 6 but rather is now in wireless communication with RAN 7. MS 2 is no longer communicating with RAN 6 but rather is communicating with RAN 7. MS 2 gets assigned a new IP address. The network ID of the new IP address of MS 2 therefore changes from the network ID of PDSN 9 to the network ID of PDSN 10. If IP node 1 had established IP communication with MS 2 using the old IP address which has a network ID of the network served by PDSN 9, and then MS 2 moved such that MS 2 was no longer in the network served by PDSN 9 but rather was in the network service by PDSN 10, then IP packets sent from IP node 1 would no longer reach MS 2. This is a problem with the internet in general because originally the internet was primarily designed to handle nodes that were fixed geographically.

To address this problem, mobile IP was developed. FIG. 3 (Prior Art) illustrates mobile IP. Mobile IP involves the IP node called "home agent" 11. In the present example, home agent 11 is operated by the operator of cellular network 3. In mobile IPv6, the mobile station always has one IPv6 address (called the home IPv6 address or HoA) that is associated with the mobile station no matter where the mobile station roams. Home agent 11 assigns the HoA 24 to MS 2. When mobile station 2 is communicating with PDSN 9, it is also assigned another IPv6 address from PDSN 9 called a "care of IP address" (CoA). This CoA 25 is the IPv6 address discussed above as having been received from PDSN 9 over a PPP session. MS 2 obtains its CoA from PDSN 9 as described above, and then using that CoA, it communicates with home agent 11 to get its HoA.

While MS 2 is communicating with home agent 11, it registers CoA 25 with home agent 11 so that home agent 11 binds CoA 25 with HoA 24 as illustrated in FIG. 3. The PDSN 9 maintains a mapping of the CoA 25 to the PPP session of MS 2 in its routing table. Assume now that IP node 1 attempts to send IP packets to MS 2, and that in this system IP node 1 knows that the IP address of MS 2 is the HoA. The IP packets therefore get routed from IP node 1 to home agent 11. Home agent 11, however, has a binding between the HoA and the CoA, so home agent 11 tunnels the IP packets to the CoA. "Tunnel" means that the home agent takes the IP packets destined to the HoA, and encapsulates them in another IP header that has the CoA as the destination IP address and the home agent's 11 IP address as the source IP address (see FIGS. 3A and 3B). The CoA in this case is an IP address assigned to MS 2 by PDSN 9. The IP packets therefore get routed to the PDSN 9. The PDSN 9 has a mapping in its routing table between this CoA and the PPP link to MS 2. The PDSN therefore, forwards these tunneled IP packets to MS 2 over its PPP session. MS 2, upon receiving the tunneled packets, decapsulates the outer IP header consisting of CoA as the destination and home agent IP address as the source address. It then looks at the inner IP header consisting of HoA as the destination and IP node 1's IP address as the source address, and sends it up the protocol stack to an application registered for these packets.

Next, assume that MS 2 moves so that it is no longer in the network served by PDSN 9 but rather is now in the network served by PDSN 10. This is the situation illustrated in FIG. 4 (Prior Art). MS 2 establishes wireless communication with RAN 7, establishes a PPP session with PDSN 10, and by the process described above obtains a new CoA 26 from PDSN 10. MS 2 then registers with home agent 11 so that home agent maps HoA 24 of the mobile station to the new CoA 26. The PDSN 10 maintains a mapping of this CoA 26 to the PPP session of mobile station 2 in its routing table. The mapping in home agent 11 is therefore updated. When home agent 11 gets subsequent IP packets from IP node 1 that are destined for the mobile station, home agent 11 uses its binding to look up the CoA 26 for PDSN 10. Home agent 11 tunnels IP packets to CoA 26. When PDSN 10 receives these tunneled packets, it looks up the PPP session associated with the new CoA 26. PDSN 10 then forwards the IP packets over the PPP session to mobile station 2. When the packets arrive at MS 2, it decapsulates the outer header and sends the inner IP packets up the protocol stack to the application registered for these packets. The source (IP node 1's IP address) and destination (HoA 24) IP address of the inner IP packet does not change when MS 2 moves from PDSN 9 to PDSN 10. Therefore, MS 2 has successfully roamed from RAN 6 to RAN 7 (or PDSN 9 to PDSN 10) without interrupting the IP data call between IP node 1 and MS 2.

In this mobile IP example, there always has to be a binding in home agent 11 between the HoA of MS 2 and the correct CoA so that home agent 11 can forward the IP packets to the PDSN with which the mobile station is currently communicating. Carriers who maintain PDSNs are often concerned that they cannot afford the resources to maintain one PPP session (and hence an IP address) for every potential cellular telephone user that could be using their cellular telephone network. Also, the PDSN may not have the capacity to maintain PPP sessions (and hence an associated CoA) indefinitely for a mobile node. Hence, the PPP state in dormancy is terminated by the PDSN after some period of inactivity. In order to ensure that the home agent does not continue to hold on to an invalid binding (i.e., CoA may no longer be assigned to the mobile node), the home agent typically has an inactivity timer for identifying bindings that have not been updated or refreshed for longer than a predetermined amount of time. If this inactivity timer expires, then the binding for this mobile node 2 is cleared. If the home agent clears the binding, however, then the mobile station can no longer be reached.

SUMMARY INFORMATION

When the binding of a mobile station (MS) in a home agent (HA) in a mobile IPv6 network expires (for example, due to the MS being dormant for too long an amount of time), then the HA carries out an encoding method to generate an interface identifier (IID) from the International Mobile Station Identifier (IMSI) of the MS. The HA updates the binding in the HA for the MS's home address (HoA). The updated binding binds the MS's home address (HoA) to a special care of address called a Mobile Associated Push CoA (MAP-CoA), where the host ID portion of the MAP-CoA is the IID, and where the network ID portion of the MAP-CoA is a special network prefix. When an IP packet destined for the MS is received at the HA, the HA responds by sending IP packets (e.g., ICMP Ping packets) destined to the MAP-CoA, which in turn get routed to the particular PDSN that serves the special network prefix. The PDSN recognizes the special network prefix, and uses a decoding method to recover the IMSI from the host ID of the MAP-CoA, and uses that IMSI to page the MS. This paging employs the standard paging mechanism supported in the mobile IP network. The MS responds to the page by setting up an IP packet data call, obtaining a new care of address from a PDSN (for example, another PDSN to which the mobile station has now roamed), and then binding the new care of address with its HoA in the HA. The binding in the HA for the MS now binds the HoA to the new care of address and not the MAP-CoA. Subsequent IP packets destined for the MS are received at the HA, and are communicated from the HA to the MS in standard mobile IPv6 fashion using the new care of address. Advantageously, IP packets can be sent to an inactive MS at its HoA without using out-of-band signaling such as SMS. (An inactive MS is a mobile node that does not have a valid PPP state or does not have an active traffic channel (hence no IP address). An active MS is a mobile node that has both a valid PPP state and an active traffic channel. A dormant MS is a mobile node that has a valid PPP state but that does not have an active traffic channel.)

Additional embodiments and details are described in the detailed description below. This summary does not purport to define the invention. The invention is defined by the claims.

BRIEF DESCRIPTION OF THE DRAWINGS

FIG. 1 (Prior Art) is a diagram that illustrates an example of dormancy in an IP (Internet Protocol) network.

FIG. 2 (Prior Art) is a diagram that illustrates a domain name and its corresponding numerical IP address (IPv4 and IPv6).

FIG. 7 is a diagram that illustrates a binding in a home agent for a mobile station.

FIG. 8 is a diagram that illustrates a communication of IP packets from an IP node, through a PDSN, and to a mobile station.

FIG. 9 is a diagram that illustrates how the binding in the home agent is changed when the binding for the mobile station expires. The binding expires in the illustrated example because the mobile station moves so that it is now in a RAN connected to the second PDSN and not the first PDSN. The mobile station does not, however, establish a new PPP connection and refresh its binding upon moving. The binding therefore expires at the home agent.

FIG. 10 is a diagram that illustrates how receipt of a subsequent IP packet onto the home agent from the IP node causes the mobile station to be paged.

FIG. 11 is a diagram that illustrates how the mobile station, in response to being paged, sets up an IP packet data call, obtains a new care of IP address, and registers the new care of IP address with the home agent, thereby updating the binding for the mobile station in the home agent.

FIG. 12 is a diagram that illustrates subsequent IP packets communicated from the IP node to the home IP address of the mobile station being communicated through the home agent, through the second PDSN (the PDSN with which the mobile station is now in wireless communication), and to the mobile station.

DETAILED DESCRIPTION

Figure 3:
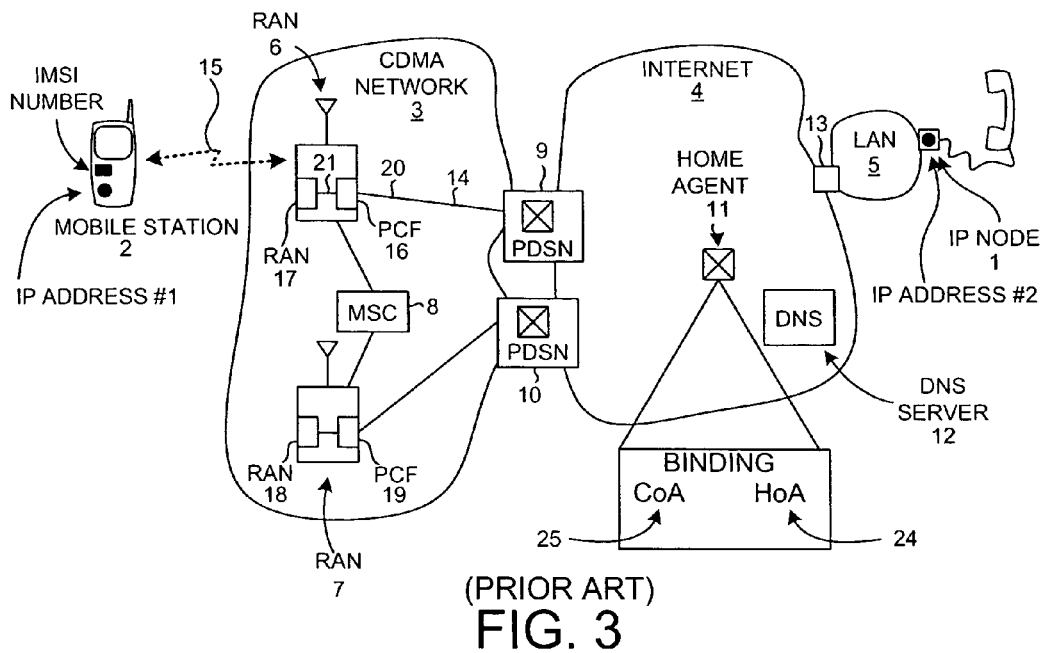
FIG. 3 (Prior Art) illustrates mobile IP communication between a mobile station and an IP node.
Figure 3A:
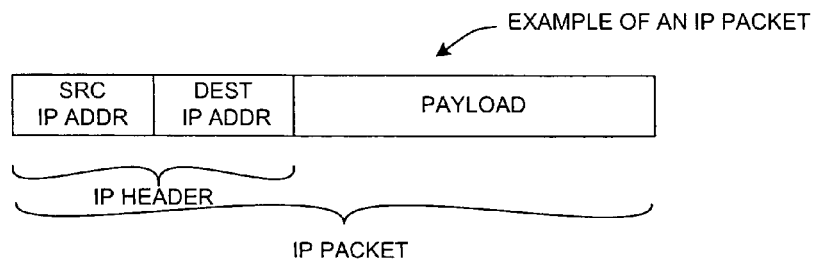
FIG. 3A (Prior Art) illustrates an IP packet.
Figure 3B:
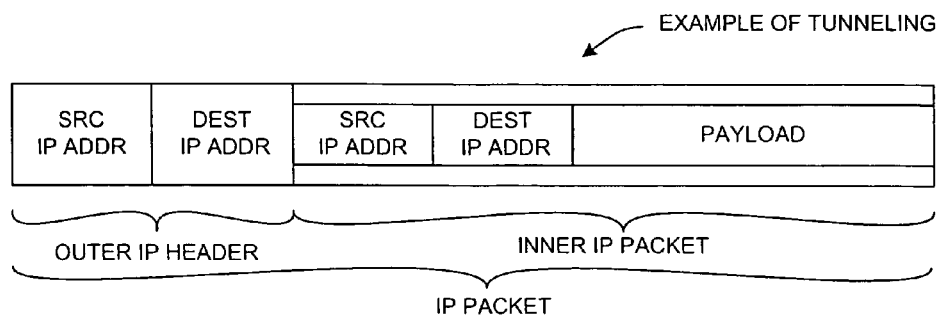
FIG. 3B (Prior Art) illustrates an example of tunneling the IP packet of FIG. 3A.
Figure 4:
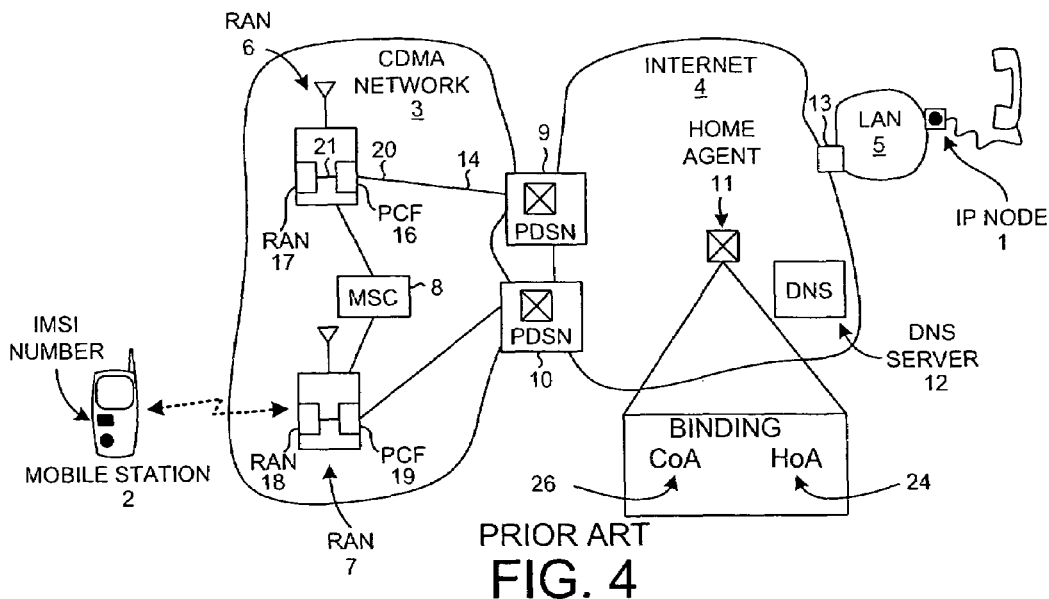
FIG. 4 (Prior Art) illustrates the network of FIG. 3 after the mobile station has moved.
Figure 5:
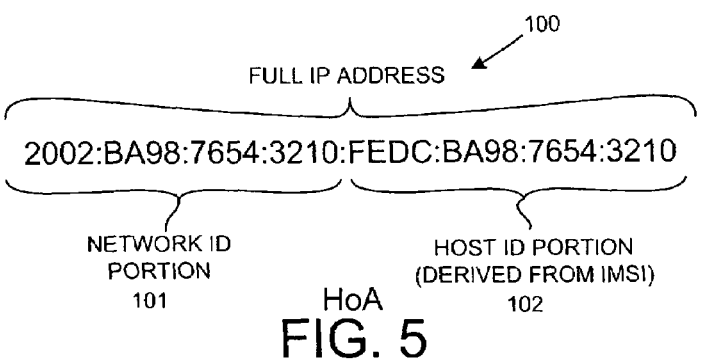
FIG. 5 is a diagram of a home IP address (HoA) in accordance with one novel embodiment.

FIG. 5 is a diagram of a home IP address (HoA) 100 in accordance with one novel embodiment. Mobile IP is employed such that a mobile station has an associated home IP address (HoA). HoA 100 includes a network ID portion 101 and a host ID portion 102. In accordance with the present embodiment, the host ID portion 102 of the HoA is an IMSI-based "interface identifier" (IID). The mobile station has a unique identification number called an (International Mobile Station Identifier (IMSI). The IID is derived from the IMSI of the mobile station. If an IMSI is supplied as an input to an encoding function, then the host ID portion 102 of the HoA associated with the IMSI is output from the encoding function. Similarly, if the host ID portion 102 of the HoA is supplied as an input to a decoding function, then the associated IMSI is output from the decoding function. Although there are many suitable encoding and decoding functions that can be used, there should be a one-to-one mapping between the host ID portion 102 of the HoA and the IMSI of the mobile station.

Figure 6:
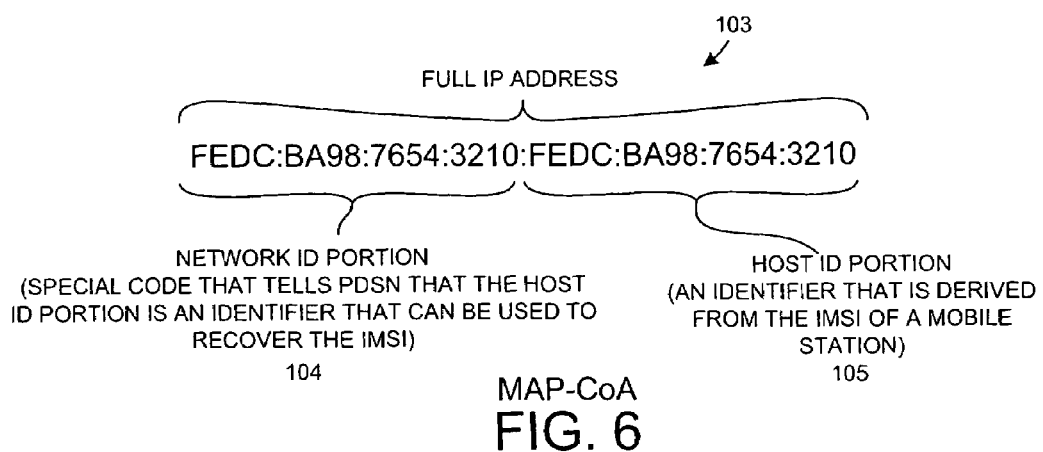
FIG. 6 is a diagram of a new type of care of IP address called a MAP-CoA in accordance with the novel embodiment of FIG. 5.

If there is no HoA to CoA binding for the mobile station in a home agent (for example, if the mobile station roams but fails to register its new CoA with the home agent) or if the HoA to CoA binding in the home agent expires (for example, if the mobile station does not refresh the binding in the home agent) or if the HoA to CoA binding in the home agent is disposed of (for example, due to the PDSN that was communicating with a dormant mobile station determining that the PDSN does not have enough resources to keep a binding for every dormant mobile station and cuts communication with the mobile station thereby preventing the mobile station from refreshing its binding in the home agent), then the home agent in accordance with the presently described novel embodiment does not dispose of the binding altogether but rather creates a special "mobile associated PUSH care of IP address" (MAP-CoA) and binds that MAP-CoA to the HoA of the mobile station FIG. 6 is a diagram of a MAP-CoA 103 in accordance with the presently described embodiment. The MAP-CoA (also called a "PUSH care of IP address) has two portions: a network ID portion 104 and a host IP portion 105. The network ID portion 104 of the MAP-CoA is a special "PUSH network ID" of a PDSN within a carrier's network. The MAP-CoA can be associated with any PDSN in the carrier's network such that the PDSN has one or more network IDs that it serves as well as the special "PUSH network ID." The PUSH network ID does not necessarily identify a network served by the PDSN per se, but rather is a code (also called a "PUSH prefix") that has a special predefined meaning to the PDSN that serves the PUSH network ID. The host ID portion 105 of the MAP-CoA is a copy of the host ID portion of the HoA. It therefore is the IID that was generated using the mobile station's IMSI.

Figure 7:
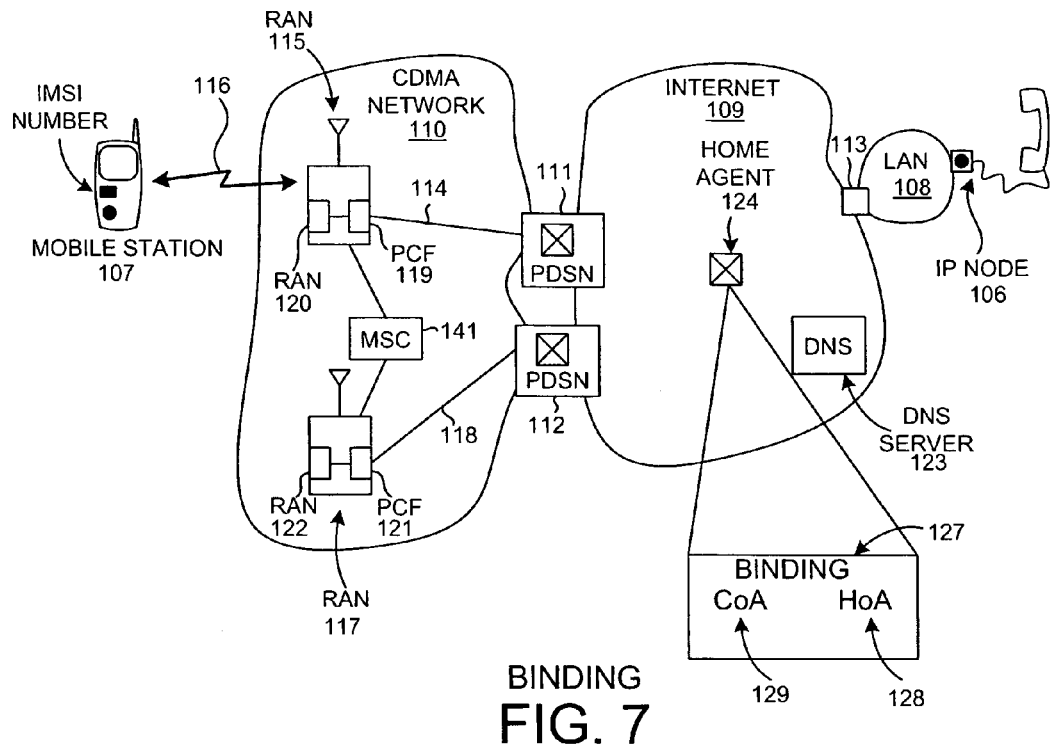
FIGS. 7-12 are diagrams of a mobile IP network at various stages in a novel method.

A novel method involving the special MAP-CoA 103 of FIG. 6 is described below in connection with the mobile IP network system topology of FIG. 7. In FIG. 7, an IP node 106 wishes to engage in IP packet data communication with a mobile station 107 (for example, a cellular telephone). IP packet communication is to occur through IP networks including LAN 108, internet 109, and CDMA network 110. In the present example, CDMA network 110 is a 3GPP2 (Third Generation Partnership Project 2) system with MIPv6 implemented. This method may, however, be equally applicable to other systems such as GPRS and 3GPP mobile networks deploying IPv6, wherein a GGSN replaces the PDSN in the example above. CDMA network 110 is coupled by PDSN routers 111 and 112 to internet 109. CDMA network 110 includes an MSC 141. LAN 108 is coupled by router 113 to internet 109. PDSN 111 communicates via a wired connection 114 with a RAN 115. If mobile station 107 is in wireless communication with RAN 115, then a point-to-point PPP session can be established between mobile station 107 and PDSN 111. Such a PPP session would be established over a wireless link 116 between mobile station 107 and RAN 115 and wired link 114 between RAN 115 and PDSN 111. Similarly, if mobile station 107 is in wireless communication with a second RAN 117, then a point-to-point PPP session can be established between mobile station 107 and PDSN 112. Such a PPP session would be established over a wireless link (not shown) between mobile station 107 and RAN 117 and a wired link 118 between RAN 117 and PDSN 112. RAN 115 includes a PCF functionality 119 and a RAN functionality 120. RAN 117 includes a PCF functionality 121 and a RAN functionality 122. A DNS server 123 and a home agent 124 are IP nodes in the internet 109.

In accordance with the novel method being described, PDSN 111 serves two network IDs. The first network ID is the network ID for RAN 115 as described above. The second network ID is the special "PUSH network ID" described above.

Figure 8:
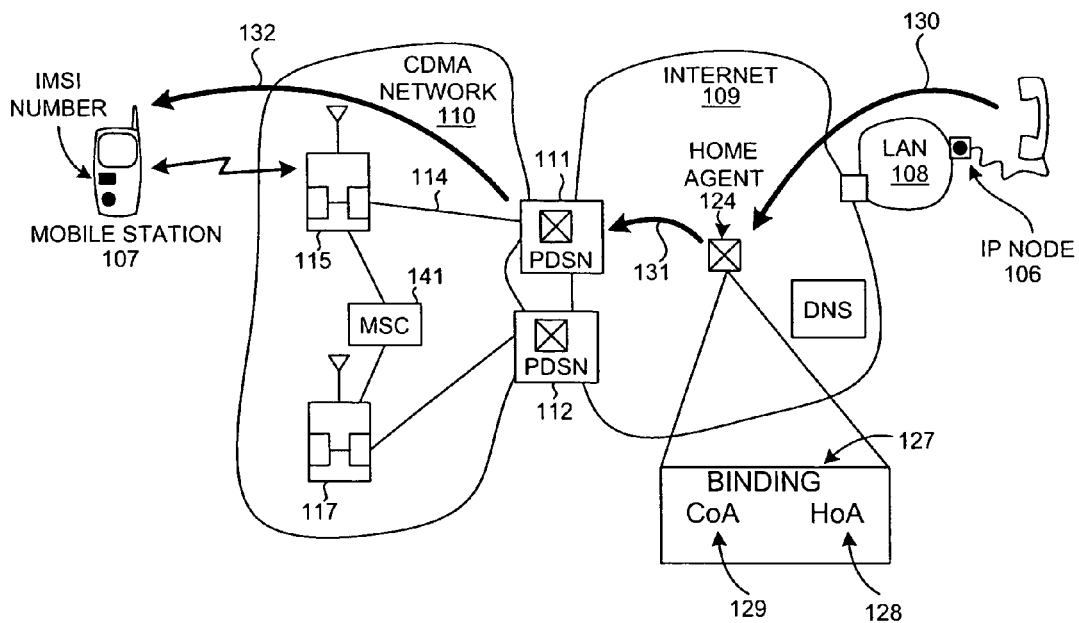

FIG. 8 illustrates transmission of an IP packet from IP node 106 to mobile station 107. To send an IP packet to mobile station 107, IP node 106 sends the IP packet to the HoA of mobile station 107 in accordance with mobile IP protocol. This is illustrated by arrow 130 in FIG. 8. When the IP packet destined for the HoA is received at home agent 124, home agent 124 consults binding 127 for HoA 128 and identifies the CoA 129 that is associated with HoA 128. Home agent 124 then tunnels the IP packet to CoA 129. To perform this tunneling, home agent 124 takes the incoming IP packet, and encapsulates it with an IP header where the destination IP address in the header is CoA 129. Because the network ID portion of the CoA is the network ID of the network served by PDSN 111, the home agent 124 uses ordinary IP routing table procedures to route the IP packet on to PDSN 111. The tunneling is illustrated by arrow 131 in FIG. 8. PDSN 111 is the router that "serves" the network ID of the CoA destination address. PDSN 111 has a mapping of the CoA to a PPP session to mobile station 107. PDSN 111 uses this mapping to identify the PPP session, and then forwards the IP packet across the identified PPP session to mobile station 107. This is illustrated by arrow 132 in FIG. 8.

Figure 9:
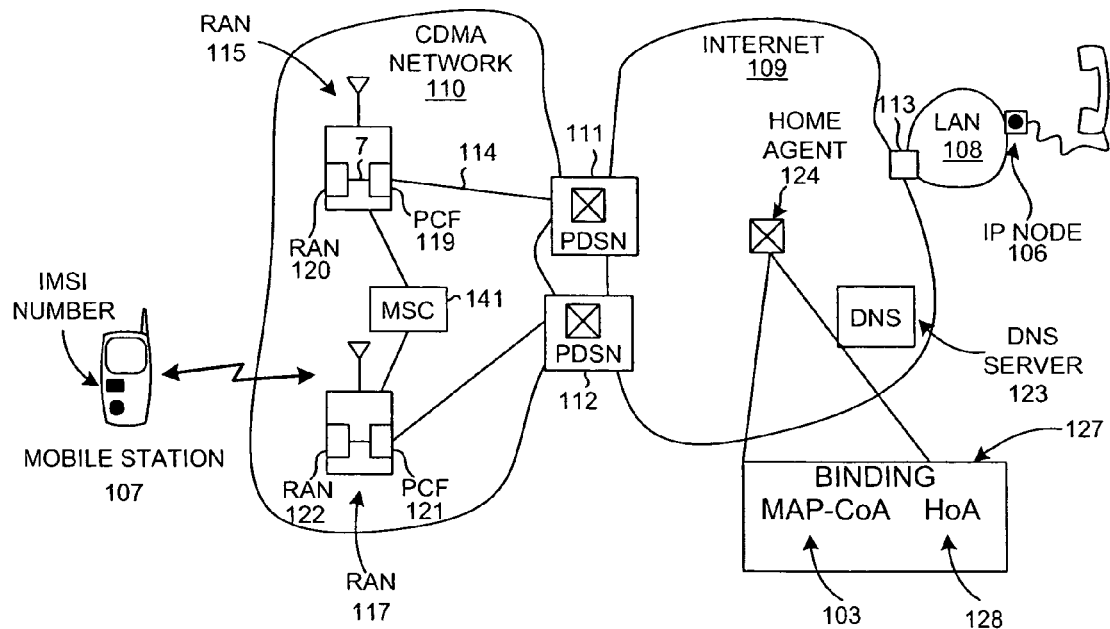

FIG. 9 illustrates a subsequent occurrence wherein the binding 127 within home agent 124 for mobile station 107 expires. Binding 127 can expire due to prolonged dormancy of mobile station 107. Binding 127 can also expire for other reasons. In the presently described example, binding 127 expires because mobile station 107 moves so that it is no longer in wireless communication with RAN 115 but rather is in wireless communication with RAN 117, which is not connected to PDSN 111. Mobile station 107 however fails to establish a new PPP session with PDSN 112 and update or refresh its new CoA in binding 127 at the home agent 124. When binding 127 is not updated or refreshed for a predetermined period of time, an inactivity timer within home agent 124 expires. Rather than the home agent 124 entirely deleting binding 127, home agent 124 in accordance with the presently described novel method creates the MAP-CoA 103 and binds the HoA for mobile station 107 to the MAP-CoA 103. The CPU of the home agent 124 executes a set of computer-executable instructions stored on a computer-readable medium, thereby generating the MAP-CoA and storing the MAP-CoA in a data storage mechanism of home agent 124. The MAP-CoA 103 is illustrated in binding 127 of FIG. 9.

Figure 10:
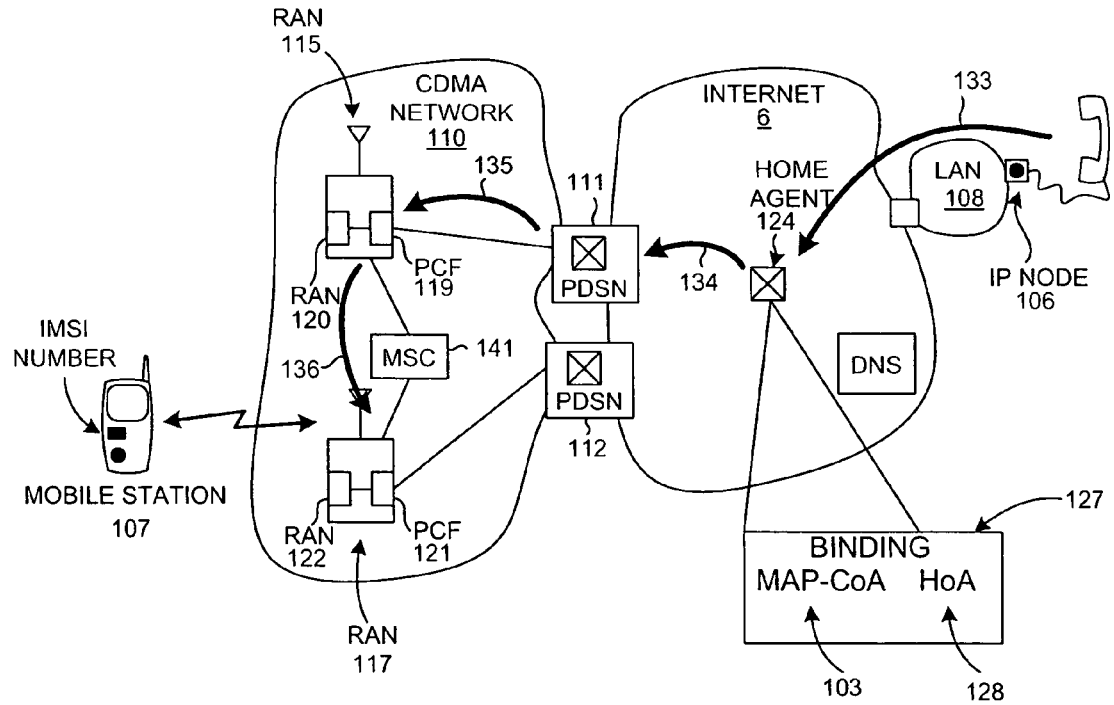

FIG. 10 illustrates a subsequent occurrence when a subsequent IP packet of the IP data call is received from IP node 106 onto home agent 124 after the MAP-CoA 103 has been bound to the HoA 128 in the home agent. The receipt of the subsequent IP packet onto home agent 124 is illustrated by arrow 133 in FIG. 10. The IP packet is sent to the (HoA) of mobile station 107 in accordance with mobile IP protocol. When the IP packet destined for the HoA is received at home agent 124, home agent 124 consults binding 127 for the HoA 128 and identifies the MAP-CoA 103 associated with the HoA 128.

Home agent then sends out an IP packet with the destination address of MAP-CoA. An ICMP-ECHO (ping) may be used. In the presently described example, home agent 124 tunnels the IP packet to the MAP-CoA 103. To do this, home agent 124 takes the incoming packet, and encapsulates it with an IP header where the destination IP address in the header is the MAP-CoA 103. Because the network ID portion of MAP-CoA 103 is a network ID served by PDSN 111, home agent 124 and other routers in the path use ordinary IP routing table procedures to route the IP packet on to PDSN 111. This is illustrated by arrow 134 in FIG. 10. PDSN 111 is the router that "serves" the network ID of the MAP-CoA destination address in this example. The PDSN that "serves" the network ID of the MAP-CoA could be some other PDSN in the network as well.

Home agent 124 either buffers IP packets subsequently received from IP node 106 or discards them in accordance with a local policy setting in home agent 124 until home agent 124 receives a binding update for the mobile station's HoA.

The PDSN 111 receives the IP packet with the destination address of MAP-CoA, looks at the network ID portion of the MAP-CoA destination IP address of the IP packet, and recognizes the special PUSH network ID. PDSN 111 knows that this PUSH network ID is not the network served by PDSN 111 that contains RAN 115, but rather is a code that has a special meaning. Due to the special PUSH network ID, PDSN 111 knows that the IMSI of the destination mobile station 107 can be obtained from the host ID portion of the MAP-CoA destination IP address of the IP packet. PDSN 111 therefore extracts the host ID portion of the MAP-CoA destination IP address of the IP packet and uses a predetermined decoding method to determine the IMSI.

Once PDSN 111 has determined the IMSI, PDSN 111 communicates with PCF 119 and instructs PCF 119 to page the particular mobile station with this IMSI. This is illustrated by arrow 135 in FIG. 10. In accordance with CDMA 2000 signaling, the MSC 141 keeps track of where each mobile station in CDMA network 110 is and what its IMSI is. PCF 119 uses standard IS41 signaling procedures to communicate with MSC 141 and to have the MSC 141 page the mobile station 107 via the RAN with which the mobile station is now communicating. In the present example, the RAN with which mobile station 107 is now communicating is RAN 117. MSC 141 therefore sends a message to RAN 117 that instructs RAN 117 to page mobile station 107. The sending of this message is illustrated by arrow 136 in FIG. 10.

Figure 11:
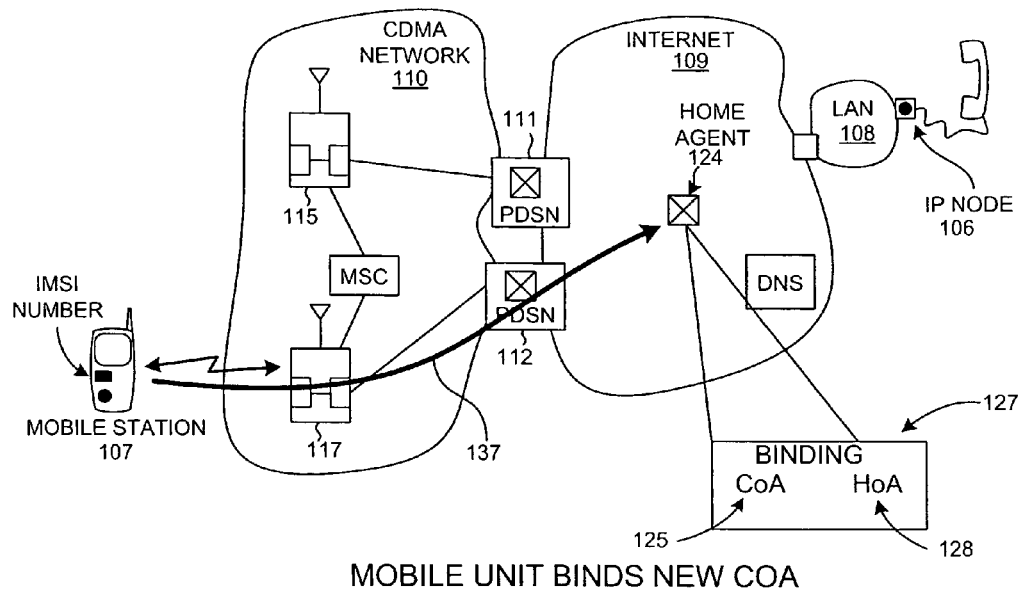

FIG. 11 illustrates a subsequent occurrence. When mobile station 107 is paged by RAN 117, it is paged with a request to setup an IP packet call (SO33 or Service Option 33 in case of 3GPP2 1x networks). Mobile station 107 sets up an IP packet data call, obtains a new CoA 125 from PDSN 112, and binds the new CoA 125 with its HoA 128 in binding 127 within home agent 124 in accordance with mobile IPv6 protocol. Binding 127 in FIG. 11 shows the HoA 128 of mobile station 107 bound to the new CoA 125. The updating of binding 127 is illustrated by arrow 137 in FIG. 11.

Figure 12:
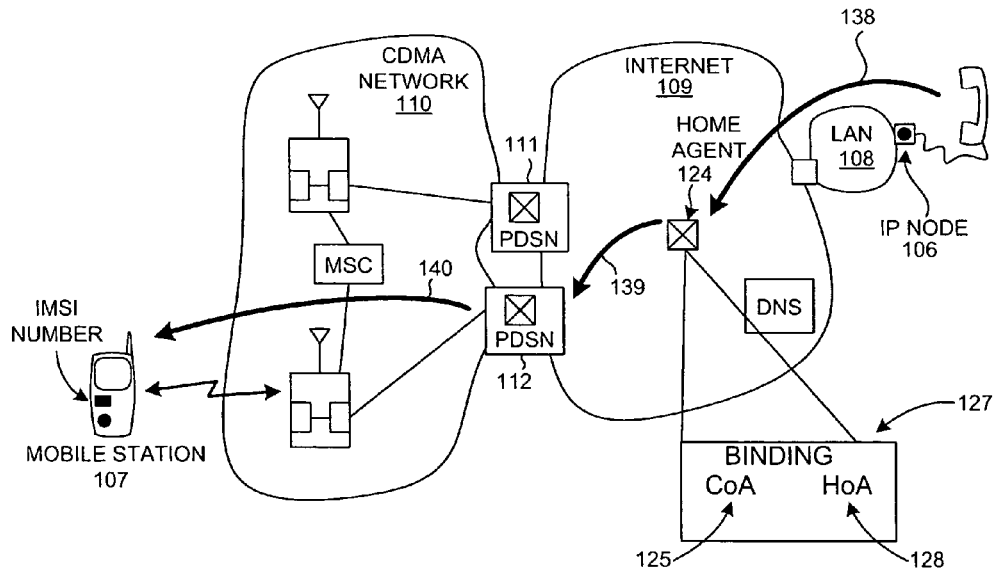

FIG. 12 illustrates a subsequent operation wherein subsequent IP packets of the IP data call are communicated from IP node 106 and are destined for the HoA of mobile station 107. These IP packets are received onto home agent 124. This is illustrated by arrow 138 in FIG. 12. In standard mobile IP fashion, home agent 124 consults its binding 127, looks up the CoA 125 associated with the HoA 128 (the destination IP address in the IP headers of the incoming IP packets), and tunnels the IP packets to the CoA 125. In the present example, the IP packets get routed to PDSN 112. This is illustrated by arrow 139 in FIG. 12. PDSN 112 has a mapping of the CoA 125 to the mobile station PPP session in its routing table. The destination IP address of the received packet at the PDSN 112 is the CoA 125 of mobile station 107. PDSN 112 consults its routing table, identifies the PPP session associated with CoA 125, and then forwards the IP packets to the mobile station 107 across the correct PPP session. This is illustrated by arrow 140 in FIG. 12.

Figure 13:
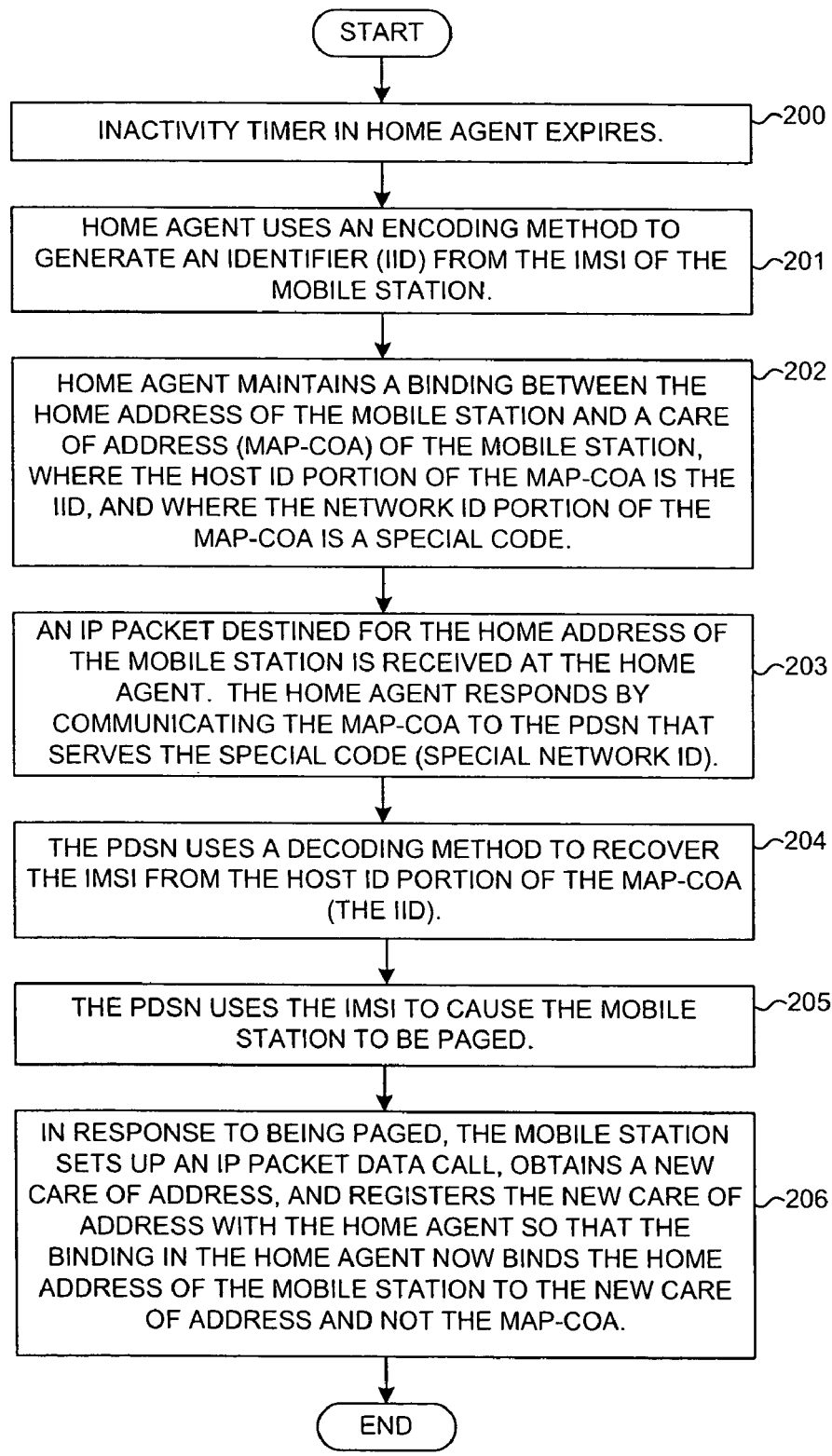
FIG. 13 is a flowchart of the novel method set forth in connection with FIGS. 7-12.

FIG. 13 is a flowchart of simplified steps in the novel method described above. Initially (step 200), the binding in the home agent for a mobile station is to be discarded, for example due to an inactivity timer in the home agent expiring.

The home agent (step 201) applies an encoding method to generate the interface identifier (IID) from the IMSI of the mobile station. The encoding method is performed such that a particular IMSI is encoded into a particular IID and such that the particular IID can be decoded by a decoding method to recover the particular IMSI. There is a one-to-one correspondence between the value of the IID and the value of the IMSI.

The home agent (step 202) maintains and updates the binding in a home agent for the home address (HoA) of the mobile station such that the HoA is now bound to a special care of address (MAP-CoA) of the mobile station, where the host ID portion of the MAP-CoA is the IID, and where the network ID portion of the MAP-CoA is a special code that tells a PDSN that the host ID portion is an IID that can be used to recover the IMSI. The special code is a network ID that is served by the PDSN.

An IP packet destined for the HoA of the mobile station is received (step 203) into the home agent. In response, the home agent tunnels IP packets to a destination IP address of MAP-CoA. The packets get routed to the PDSN that serves the special code (the special host ID).

The PDSN receives IP packets whose destination IP address is the MAP-CoA and uses the decoding method (step 204) to recover the IMSI from the host ID portion of the MAP-CoA. In some embodiments, a special function within the PDSN receives the MAP-CoA and uses the decoding method to recover the IMSI. In other embodiments, another part of the PDSN receives the MAP-CoA and uses the decoding method to recover the IMSI. Regardless of the structure of the PDSN, the decoding method is the inverse of the encoding method as described above in connection with step 201.

The PDSN then uses the recovered IMSI to cause the mobile station to be paged (step 205) by whatever paging mechanism is supported by the wireless communication system.

In response to being paged, the mobile station (step 206) communicates with a PDSN (for example, another PDSN to which the mobile station has roamed), sets up an IP packet data call, obtains a new care of address CoA from the PDSN in normal fashion, and registers the new CoA with the home agent. The registering of the new CoA updates the binding in the home agent for the HoA of the mobile station such that the HoA is no longer bound to the MAP-CoA but rather is now bound to the new CoA.

Advantages of the novel method described above may include: 1) From the perspective of another node on the network that is trying to engage in an IP call with the mobile station, the other node only needs to know the home IP address (HoA) in order to be able to send IP packets to the mobile station. The other node never needs to send an SMS or use some other out-of-band mechanism to contact the mobile station. 2) From the carrier's perspective, the carrier does not need to reserve unlimited care of addresses for the mobile station, but rather the carrier can assign an IP address only for a short duration of time. If the mobile station does not use the IP address for more than a predetermined about of time, then the carrier can release the resources knowing that if another node on the network tries to communicate with the mobile station later, that the mobile station can still be paged so that it can obtain a new care of address and continue communication with the other node. 3) System software is simplified because there is no need to interface between an IP communication and an out-of-band communication.

Specific Example of PDSN Actions:

Set forth below is a specific example of a method that is performed when a PDSN receives an IP packet with the special "PUSH prefix" code in the IP destination address:

1. The PDSN saves the destination address and discards the packet. The PDSN starts a "page block timer."

2. The PDSN ignores any other packets received with the same destination address for a configurable duration of time specified by "page block timer."

3. The PDSN uses the decoding method to recover the IMSI from the IID (the host ID portion) of the destination address.

4. The PDSN forwards the IMSI to the RAN via A11/A9 signaling.

5. If the mobile station is in the same RAN, then the mobile station is paged by the RAN using standard IS-41/cdma2000 signaling procedures.

6. If the mobile station is not in the same RAN, then the mobile station is located via the MSC and is paged by the current RAN (with which the mobile station is currently communicating) using standard IS-41/cdma2000 signaling procedures.

7. The service option (SO) used to page the mobile station can be the standard SO33 or any other SO that tells the mobile station to originate a packet data call and to register its new CoA (obtained after setting up the new call) with the home agent.

8. Once the home agent obtains the new binding, the home agent starts tunneling packets received for the home address (HoA) of the mobile station to the new CoA in the binding.

When the "page block timer" expires, then the PDSN follows steps 1-8 upon receiving a packet with the special "PUSH prefix" code in its IP destination address. The steps 1-8 above ensure that the mobile station is always reachable at the home address (HoA), irrespective of whether or not there is an existing valid binding for the mobile station in the home agent.

Specific Example of an Encoding Method:

The following describes one encoding method by which an IPv6 interface ID is determined from an IMSI. By making the encoding method a well known method, anyone who knows the mobile station's IMSI can derive its interface identifier (IID) and vice-versa.

The home agent obtains the mobile station's IMSI from its home address (HoA).

The IMSI is a fifteen digit number. When coded as a Binary Coded Decimal (BCD) number, this becomes a sixty-bit binary number. For example, if the IMSI is of the form in decimal digits: 003 (MCC)-008 (MNC)-586584628 (MSIN), then in BCD coding it is the following sixty-bit quantity: 0000-0000-0011-0000-0000-1000-0101-1000-0110-0101-1000-0100-0110-0010-1000. The interface identifier (IID) is a 64-bit quantity, which can be obtained by inserting four bits "0000" between the first and second nibble of the IMSI representation in BCD as follows: 0000-0000-0000-0011-0000-0000-1000-0101-1000-0110-0101-1000-0100-0110-0010-1000. Note that the seventh bit (universal/local) bit is set to zero to indicate local scope. This 64-bit interface identifier (IID) is represented in hexadecimal as follows: 0003:0085:8658:4628 or 3:85:8658:4628. Because the IMSIs assigned to cellular devices are unique, the IID obtained from the IMSI of a mobile station will be unique, not only within a service provider domain, but also across multiple service provider domains.

Although certain specific embodiments are described above for instructional purposes, the present invention is not limited thereto. Although an example of a novel method is described above that works in a 3GPP2 network, the novel method is equally applicable to any mobile network deploying mobile IPv6. Rather than waiting until an inactivity timer expires to generate the MAP-CoA, the MAP-CoA can be generated beforehand so that the pre-existing MAP-CoA is bound to the HoA (the binding is generated) in response to the expiration of the inactivity timer. Although an example involving IP telephony is described above, the novel method applies to IP communications in general and need not involve telephony or voice of IP telephony. Accordingly, various modifications, adaptations, and combinations of the various features of the described specific embodiments can be practiced without departing from the scope of the invention as set forth in the claims.

What is claimed is:

1. A method comprising: maintaining a binding in a home agent of a mobile IP system for a mobile station (MS) when a first binding between a home address of the MS and a first care of address (CoA) of the MS expires, the binding being between the home address of the mobile station and a second CoA of the mobile station, wherein the second CoA comprises a network ID portion and a host ID portion, wherein the network ID portion comprises a special code operable to identify a packet data serving node (PDSN) corresponding to the first CoA and further operable to cause the PDSN, upon detecting the special code, to page the mobile station with a request to set up an IP communication, wherein the host ID portion being usable to derive an identification number of the MS.

2. The method of claim 1, further comprising:
  maintaining a timer having an expiration, and wherein the maintaining of the binding occurs in response to the expiration of the timer.

3. The method of claim 1, further comprising generating an identifier, using an encoding method, from an identification number of the mobile station such that the identifier can be decoded by a decoding method to recover the identification number, and maintaining the identifier as the host ID portion of the second CoA.

4. The method of claim 3, wherein the identifier has a one-to-one correspondence with the identification number of the mobile station.

5. The method of claim 3, wherein the mobile IP system is a mobile IPv6 system, and wherein the second CoA is a PUSH care of address (MAP-CoA).

6. The method of claim 3, wherein the identification number is an International Mobile Subscriber Identity (IMSI).

7. The method of claim 3, further comprising:
receiving into the home agent a first IP packet destined for the home address of the mobile station and in response communicating a second IP packet having as a destination the second CoA;
receiving the second IP packet into the PDSN and using the decoding method in the PDSN to recover the identification number from the second CoA; and
using the identification number to page the mobile station.

8. The method of claim 7, wherein the communicating is achieved by tunneling the IP packet to the second CoA.

9. The method of claim 7, wherein the host II) portion is the identifier, the method further comprising:
in the PDSN, detecting that the network ID portion is the special code; and
in response to said detecting, using the decoding method in the PDSN to recover the identification number from the care of address.

10. The method of claim 7, further comprising registering a new CoA at the home agent based on the mobile station responding to the page, setting up an IP data call with a new PDSN, and obtaining the new CoA corresponding to the new PDSN, such that the binding in the home agent now binds the home address of the mobile station and the new CoA.

11. The method of claim 7, wherein the PDSN comprises a first network ID corresponding to a first radio network (RAN) and a second network ID corresponding to the special code, and further comprising determining, in the PDSN, whether the second IP packet comprises the second network ID, wherein the using of the decoding method in the PDSN to recover the identification number from the second CoA is based on the determining.

12. The method of claim 11, further comprising instructing a packet control function (PCF), by the PDSN and based on the determining, to page the mobile station corresponding to the identification number, wherein the instructing is operable to cause a mobile switching center (MSC) to page the mobile station via a second RAN.

13. The method of claim 3, wherein the special code is usable to determine that the host ID portion of the second CoA is indicative of the identification number of the mobile station.

14. The method of claim 3, wherein the mobile station has an International Mobile Subscriber Identity (IMSI), the method further comprising:
communicating the second CoA to a node on a network, the node deriving the IMSI of the mobile station from the host ID portion of the second CoA.

15. The system of claim 14, wherein the identification number is an International Mobile Subscriber Identity (IMSI).

16. The method of claim 1, further comprising generating the second CoA based on an expiration of a first binding between the home address of the mobile station and the first CoA, and binding the second CoA to the home address.

17. The method of claim 1, further comprising:
binding the first CoA to the home address based on the mobile station setting up an IP data call via a first radio access network (RAN) with the PDSN;
determining an expiration of the binding of the first CoA to the home address;
generating the second CoA based on the determined expiration; and
binding the second CoA to the home address.

18. A system for maintaining communication with a roaming mobile station (MS), the system comprising:
a home agent (HA) that maintains a binding for the MS when a first binding between a home address of the MS and a first care of address (CoA) of the MS expires, the binding including a second CoA, the second CoA including a first portion and a second portion, the first portion comprising a special code operable to identify a packet data serving node (PDSN) corresponding to the first CoA and further operable to cause the PDSN, upon detecting the special code, to page the mobile station with a request to set up an IP communication, the second portion being usable to derive an identification number of the MS; and
the PDSN operable to receive a data packet from the HA having as a destination the second CoA and, based on detecting the special code, further operable to derive the identification number from the second portion and, further based on detecting the special code, operable to cause the MS to be paged using the identification number.

19. The system of claim 18, further comprising a packet control function (PCF), a mobile switching center (MSC) and a Radio Access Network (RAN), wherein the PDSN causes the MS to be paged by instructing the PCF to page the MS identified by the identification number, and wherein the PCF in turn causes the MSC to page the MS via the RAN.

20. A mobile IP system, comprising:
means for generating a binding for a mobile station (MS) when a first binding between a home address of the MS and a first care of address (CoA) of the MS expires, where the binding is between the home address of the MS and a second CoA of the MS, wherein the second CoA includes a first portion and a second portion, wherein the first portion comprises a special code operable to identify a packet data serving node (PDSN) corresponding to the first CoA and further operable to cause the PDSN, upon detecting the special code, to page the mobile station with a request to set up an IP communication, wherein the second portion is derived from an International Mobile Subscriber Identity (IMSI); and
a data storage mechanism that stores the binding.

21. The mobile IP system of claim 20, wherein the means for generating is a processor that carries out an encoding method such that the IMSI is converted into the second portion.

22. The mobile IP system of claim 20, wherein the processor is a processor of the home agent of the mobile IP system, and wherein the data storage mechanism is a data storage portion of the home agent, the data storage portion being of a storage type taken from the group consisting of: a semiconductor memory, a magnetic storage medium, a magnetic hard disk, an optical storage medium, an amount of distributed network storage.

23. The mobile IP system of claim 20, wherein the mobile IP system is a mobile IPv6 system, and wherein the second care of address is a PUSH care of address (MAP-CoA).

24. The mobile IP system of claim 20, wherein the PDSN comprises a first network ID corresponding to a first radio network (RAN) and a second network ID corresponding to the special code, further comprising:
means for receiving a first IP packet destined for the mobile station;

means for communicating, in response to receiving the first IP packet, a second UP packet having as a destination the second CoA;

wherein the PDSN is operable to receive the second UP packet and, based on detecting the special code, is further operable to decode the second portion to derive the IMSI, and wherein the PDSN is further operable to use the IMSI to page the mobile station.

25. The mobile IP system of claim 24, further comprising a packet control function (PCF) operable to receive instructions from the PDSN, based on the detecting of the special code, to page the mobile station corresponding to the IMSI, wherein the PCF is operable to cause a mobile switching center (MSC) to page the mobile station via a second RAN.

26. A computer-readable medium having computer-executable instructions stored thereon, comprising: instructions for causing a computer to maintain a binding in a home agent of a mobile IP system for a mobile station (MS) when a first binding between a home address of the MS and a first care of address (CoA) of the MS expires, the binding being between the home address of the mobile station and a second CoA of the mobile station, wherein the second CoA comprises a network ID portion and a host ID portion, wherein the network ID portion comprises a special code operable to identify a packet data serving node (PDSN) corresponding to the first CoA and further operable to cause the PDSN, upon detecting the special code, to page the mobile station with a request to set UD an IP communication, wherein the host ID portion being usable to derive an identification number of the MS.

27. The computer-readable medium of claim 26, further comprising instructions for generating an identifier, using an encoding method, from an identification number of the mobile station such that the identifier can be decoded by a decoding method to recover the identification number, and maintaining the identifier as the host ID portion of the second CoA.

28. The computer-readable medium of claim 27, further comprising:

instructions for receiving into the home agent a first IP packet destined for the home address of the mobile station and in response communicating a second IP packet having as a destination the second CoA;

instructions for receiving the second IP packet into the PDSN and using the decoding method in the PDSN to recover the identification number from the second CoA; and instructions for using the identification number to page the mobile station.

29. The computer-readable medium of claim 27, wherein the host ID portion is the identifier, the method further comprising:

in the PDSN, instructions for detecting that the network ID portion is the special code; and in response to the detecting, instructions for using the decoding method in the PDSN to recover the identification number from the care of address.

30. The computer-readable medium of claim 27, further comprising instructions for registering a new CoA at the home agent based on the mobile station responding to the page, instructions for setting up an IP data call with a new PDSN, and instructions for obtaining the new CoA corresponding to the new PDSN, such that the binding in the home agent now binds the home address of the mobile station and the new CoA.

* * * * *

UNITED STATES PATENT AND TRADEMARK OFFICE
CERTIFICATE OF CORRECTION

PATENT NO. : 7,680,123 B2  Page 1 of 1
APPLICATION NO. : 11/349617
DATED : March 16, 2010
INVENTOR(S) : Veerepalli It is certified that error appears in the above-identified patent and that said Letters Patent is hereby corrected as shown below:

Column 13, line 17, claim 9: "II) portion" to read as --1D portion--

Column 15, line 2, claim 24: "UP packet" to read as --IP packet--

Column 15, line 4, claim 24: "UP packet" to read as --IP packet--

Signed and Sealed this
Seventeenth Day of May, 2011

David J. Kappos
*Director of the United States Patent and Trademark Office*